March 15, 1955   S. D. POOL   2,703,956
ROW DIVIDERS FOR CROPS
Filed Nov. 20, 1951   3 Sheets-Sheet 1

Inventor:
Stuart D. Pool
By: Paul O. Pippel
Attorney.

ional Harvester Company, a corporation of New Jersey"># United States Patent Office 2,703,956
Patented Mar. 15, 1955

2,703,956
ROW DIVIDERS FOR CROPS

Stuart D. Pool, Moline, Ill., assignor to International Harvester Company, a corporation of New Jersey Application November 20, 1951, Serial No. 257,396

2 Claims. (Cl. 56—317)

This invention relates to a new and improved row divider for crops.

The divider concerns agricultural crops, and particularly crops having stalk-like plants, such as cane, corn, or the like. Cane stalks grow in stools and the heavy and very tall stalks are susceptible to blowing over and becoming entangled with the stalks of adjacent rows. Cane fields invariably have a mat of down stalks over the entire field and in order to employ a mechanical harvesting device it is essential that the planted rows be divided so that the harvesting machine may pick up and harvest a predetermined row of the cane crop.

It is, therefore, an important object of this invention to provide means for separating entangled rows of crop stalks.

An important object of this invention is the provision of means for cutting through entangled cane stalks from adjacent rows of plants, and clearly defining the cane into separate rows.

Another important object of this invention is to supply a device which will pick up down cane stalks and simultaneously cut through entangled stalks to clearly define individual rows of cane.

Other and further important objects of this invention will become apparent from the disclosures in the following specification and accompanying drawings.

In the drawings:

Fig. 4 is a sectional view taken on the line 4—4 of Fig. 2.

Figure 2:
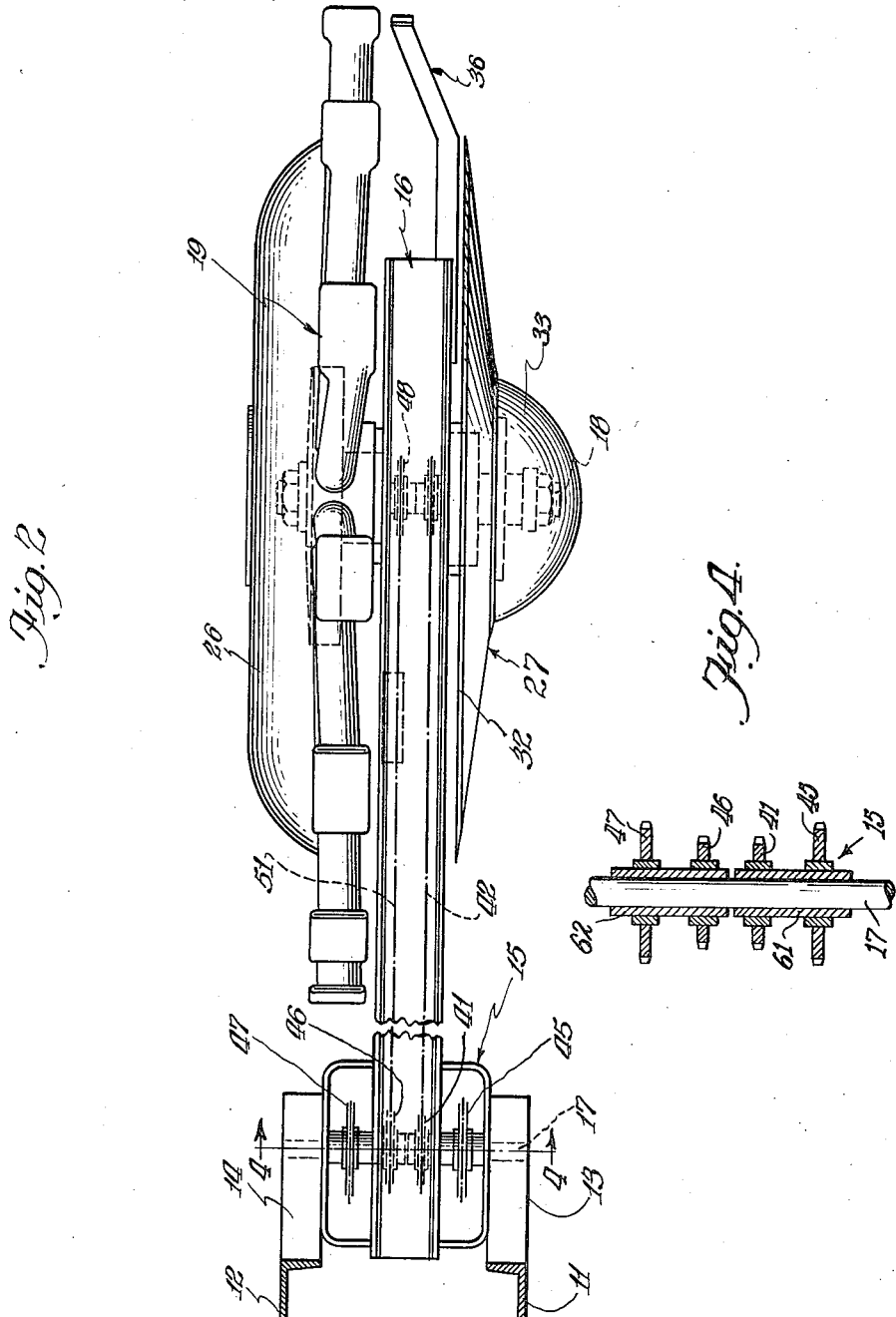
Fig. 2 is a top plan view of the divider as shown in Fig. 1 slightly enlarged.

As shown in the drawings, the reference numeral 10 indicates generally the supporting framework of a cane harvesting machine. The frame structure 10 includes a pair of oposing channel members 11 and 12, as best shown in Fig. 2. Each of the vertically disposed channel members 11 and 12 includes a forwardly projecting, fixed suporting arm 13 and 14 respectively. The cane harvesting machine is adapted to be propelled forwardly through a field of standing cane to effect a cutting of a cane at its lower end, and also stripping the leaf material therefrom. As stated in the objects above, it is desirable to provide some means which extend forwardly of the harvesting machine to clearly define the rows of cane and separate the inter-engaging stalks from adjacent rows so that the harvesting machine may pick and treat only those stalks from one row.

Figure 3:
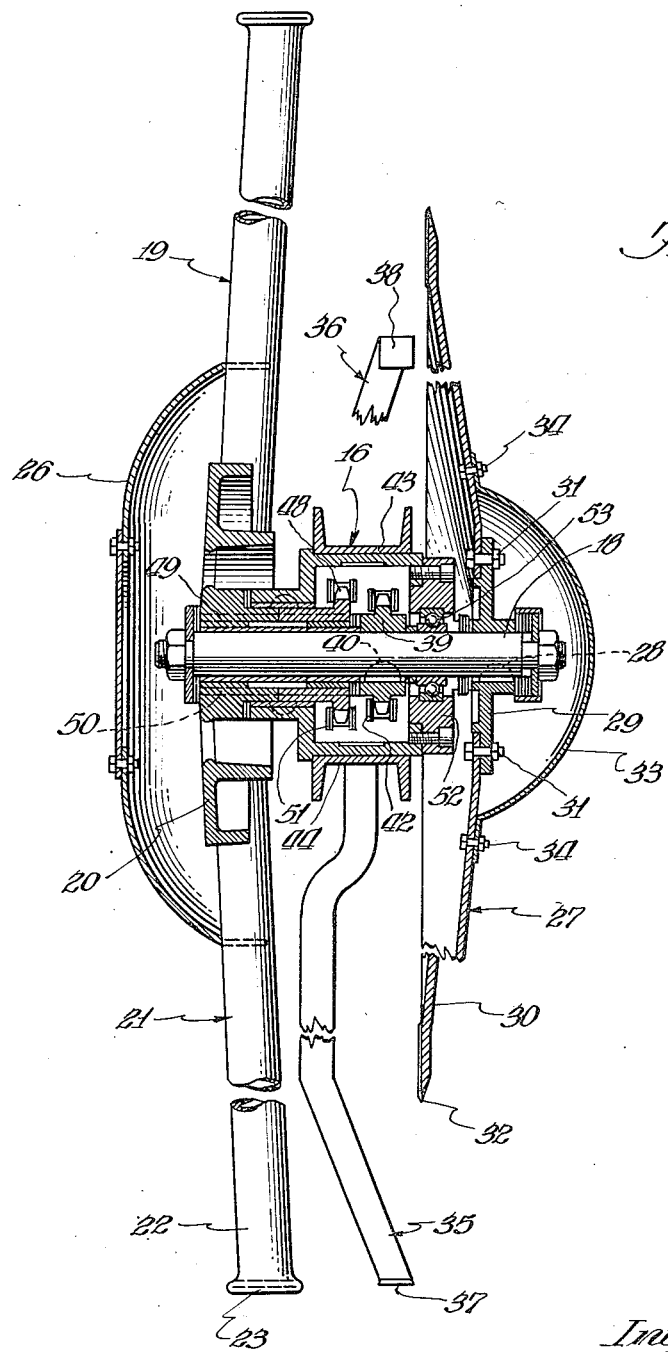
Fig. 3 is an enlarged vertical sectional view taken on the line 3—3 of Fig. 1.

The row divider of this invention comprises a stationary supporting housing 15 fixedly carried between the forwardly projecting arms 13 and 14 of the main harvester frame 10. An arm structure 16 is pivotally carried in the housing 15 on the transverse shaft 17. The arm structure 16 is provided near its forward end with a transversely disposed shaft 18. On one side of the arm structure 16 the shaft 18 carries a rotor member 19 which is equipped with a hub 20 and radially extending fingers 21. The fingers are preferably made from pipe and have their outward end portions 22 bent angularly rearwardly, as viewed in the lower half of the rotor in Fig. 1 of the drawings. The extreme outer ends of the pipe fingers 21 are bent still further rearwardly, and the pipe is collapsed as shown at 23, providing a flat surface for this outer end of the finger. The rotor member 19 is adapted to engage and ride on the ground 24. The bent portions of the radial fingers 21 are such that as the rotor 19 rotates in a clockwise direction, as indicated by the arrow 25 in Fig. 1, stalks lying down and across the rows will be gathered up by the scoop formed by the flat extensions 23 and the angular portions 22. The rotor member 19 is further provided with a shield-like hub portion 26, as best shown in Fig. 3. On the opposite side of the arm structure 16 is a relatively large circular disc 27. The disc 27 is fastened to the shaft 18 by means of a key 28 and thus, as the shaft 18 is rotated, the disc 27 will be similarly rotated. The disc 27 has an inner, centrally located hub 29, which, as just stated, is keyed to the shaft 18. The outer annular portion 30 of the disc 27 is preferably made of a hardened steel and is removably attached to the hub 29 by means of bolts 31 or the like. The circumferential edge of the disc 27 is sharpened, as shown at 32. An auxiliary hub or shield 33 is adapted to conceal the rotating shaft 18. This outer hub 33 is fastened by means of bolts or rivets 34 or the like, to the annular portion 30 of the disc 27.

The arm structure 16 is additionally provided with outwardly extending fingers 35 and 36 which lie centrally between the rotor member 19 and the rotating cutting disc 27. The fingers 35 and 36 are substantially equal in length to the radially extending fingers 21 of the rotor 19. The finger 35 is located just to the rear of the vertical center line through the shaft 18. The finger 36 is disposed forwardly of the vertical center line adjacent the upper half of the rotor 19. The fingers 35 and 36 are bent, as shown at 37 and 38, respectively, in a direction opposite the flat bent extensions 23 of the radially extending fingers 21 of the rotor member 19. Thus the finger 35 has its outer end portion 37 bent forwardly, and the finger 36 has its outer end portion 38 bent upwardly and rearwardly.

Figure 1:
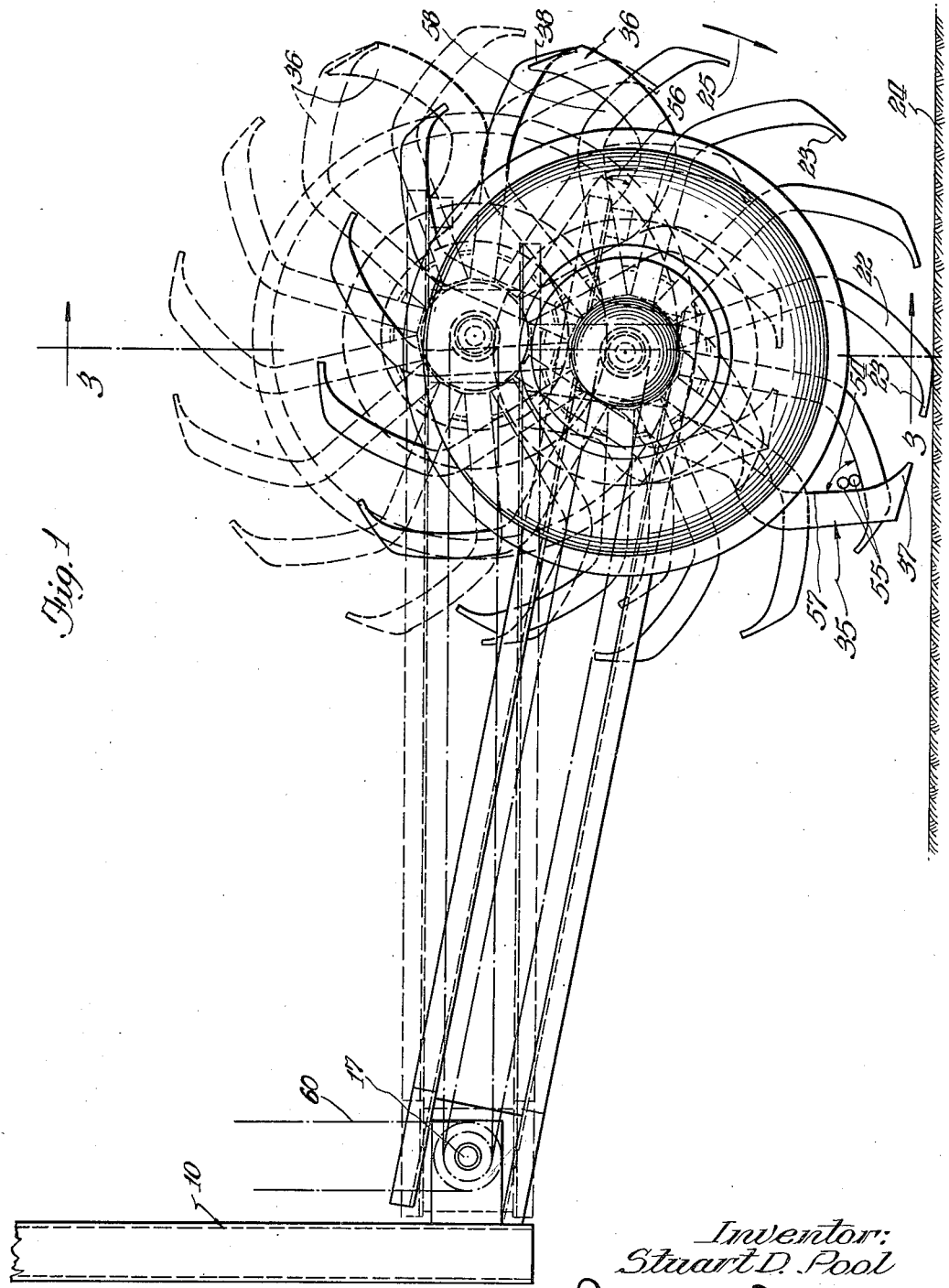
Fig. 1 is a side elevational view of the row crop divider of this invention.

The shaft 18, disposed at the forward end of the arm structure 16, is provided with a sprocket 39 keyed thereto, as shown at 40. It is thus apparent that as the sprocket 39 rotates, the shaft 18 simultaneously rotates and thereupon the enlarged cutting disc 27 is rotated. As best shown in Fig. 2, the shaft 17 carried across the housing 15, is provided with a pair of abutting sleeves 61 and 62. The sleeves are mounted for free journalled rotation on the shaft 17. A sprocket 41 is affixed to the sleeve 61 and is in longitudinal alignment with the sprocket 39, whereby a chain 42 extending around the sprockets 39 and 41, and within the arm structure 16 defined by vertically spaced channel members 43 and 44, will transmit rotational drive from the sleeve 61 about the shaft 17 to the shaft 18. A sprocket 45 is mounted on the sleeve 61 within the housing 15 and spaced from the sprocket 41. Chain driving means diagrammatically indicated at 60 in Fig. 1 is adapted to impart rotation to the sprocket 45 whereby drive is carried to the sprocket 41 and eventually to the rotating cutting disc 27. A further pair of sprockets 46 and 47 are mounted on the sleeve 62 over the shaft 17 within the housing 15 and perform functions similar to sprockets 41 and 45, respectively. The sprocket 46 is in longitudinal alignment with a sprocket 48. The sprocket 48 lies adjacent the sprocket 39 within the arm structure 16. The sprocket 48 is not attached to the shaft 18 but, rather, is mounted on a sleeve 49 concentric with the shaft 18 and journaled thereover. The hub 20 of the rotor member 19 is splined or otherwise fastened to the sleeve 49, as shown at 50. Separate driving chain means (not shown) delivers rotational drive to the sprocket 47 and thus also the sleeve 62. A chain 51 is adapted to impart rotation from the sprocket 46 to the sprocket 48, whereupon the rotor member 19 is rotatably driven. The arm structure 16 is completed by a hub 52 joining the spaced channel members 43 and 44, and includes a bearing member 53 to provide for free and easy rotation of the shaft 18 therein.

In the operation of the row divider of this invention the harvesting machine is propelled forwardly through a field of standing cane stalks. The rotor member 19 would, if not otherwise driven, act as a "walker" on the ground 24. It is, however, desired to rotate the rotor member 19 at a slightly greater speed than the device would have if it were not driven by external means.

Thus, rotational drive is delivered to the sprocket 47 at a speed just in excess of the ground speed, and through the medium of sprockets 46 and 48 and the chain 51 drive is delivered to the rotor member. The rotor member 19 rotates, as indicated by the arrow 25, and its fingers 21 by reason of their bent ends 22 and 23, claw into the down and matted stalks. These stalks nestle within the clutches of the fingers 21 defined by the bent end portions 22, and as the rotor member 19 rotates, the stalks will engage the upwardly extending stationary finger 35 and be barred from further rearward movement. A gradually decreasing angle 54 is created between the fingers 21 and the stationary finger 35 whereupon stalks, illustrated at 55, will be carried upwardly and rearwardly along the inclined surface of the stationary finger 35 and will thus move into the rotating cutter disc 27. This causes a shearing of the stalks 55 and a complete separation of the cane into predetermined width rows. Thereafter, as the harvesting machine moves along the standing cane it will be able to, and does, harvest all cane within the defined and separated row. The finger 36 performs a similar function on the top side of the rotor member 19. The cane stalks do not merely become entwined at their lower ends but are similarly interengaged at their upper ends, and it is necessary to untangle, or by means of cutting, separate the cane stalks into individual rows. As the rotor member 19 rotates, the bent end portions 22 and 23 move forwardly and downwardly through the standing cane and cause any cross stalks to be carried thereby and moved into the stationary finger 36 whereupon a similar diminishing angle 56 will cause the stalks to rotate up the inclined surface of the finger 36 and into the outer rotating knife edge 32 of the disc 27. It is thus apparent that the row divider of this invention acts to separate the stalks from adjacent rows by lifting and cutting the stalks and thereupon clearly defining separate and individual rows which can be adequately treated by mechanical harvesting equipment. It is preferable that the disc 27 be rotated in either direction at a speed considerably in excess of the speed of rotation of the rotor member 19. This higher speed is acomplished by a higher speed of input drive to the chain 60. The fingers 35 and 36 are provided with knife edges as shown at 57 and 58 respectively. It is thus evident that certain of the stalks 55 lying across more than one row of cane will be cut merely by engagement with the knife edges of the fingers 35 and 36, thus minimizing the cutting work necessary by the rotating cutter disc 27. The inclined knife surfaces 57 and 58 are such that there is not a positive cutting action, but merely sufficient to cause many of the smaller stalks to be sheared, and employing the large rotating cutting disc 27 to accomplish the shearing of the larger heavier stalks. In any event, the inclined knife surfaces 57 and 58 of the fingers 35 and 36 act to deliver the stalks upwardly into the field of travel of the rotating disc 27.

Numerous details of construction may be varied throughout a wide range without departure from the principles disclosed herein, and I therefore do not propose limiting the patent granted hereon otherwise than as necessitated by the appended claims.

What is claimed is:

1. A crop row divider comprising a mobile frame supporting structure, an arm hingedly mounted on the forward end of said frame-supporting structure, a ground-engaging rotor journaled on the forward end of said arm spaced from its hinge mounting, said rotor including a hub, a plurality of radially-extending fingers fixed to said hub, said fingers having their outer end portions bent angularly toward the frame-supporting structure as viewed at the bottom ground-engaging portion of the rotor, means driving said rotor at slightly greater than vehicle ground speed in a clockwise direction as viewed from the right side, a cutter disc journally mounted on said arm in axial alignment with said rotor, said disc being somewhat smaller in diameter than said rotor and spaced laterally only a slight distance apart, guide fingers fixed to said arm and angled opposite to the rotor fingers, said guide fingers projecting radially outwardly a distance substantially equal to the rotor fingers, said rotor fingers and guide fingers cooperating with each other to lift crop stalks upwardly into said cutter disc.

2. A crop row divider comprising a mobile support, a forwardly projecting arm hinged to said mobile support for vertical swinging movement, a ground-engaging rotor carried on the forward extension of said arm, said rotor including a hub portion journaled on said arm, radial fingers projecting from the periphery of said hub, each of the outer ends of said radial fingers bent in the same direction and the fingers and their bent portions all lying in substantially the same plane as the hub, the outer bent portions of the fingers projecting in a rearward direction toward the mobile support as viewed on the bottom half of the rotor, and finger means stationary with said hinged arm and lying adjacent said rotor fingers, said stationary finger means having its outer end bent in a direction opposite the rotor radial fingers, whereby crop material picked up by said rotor fingers will be barred from continuous travel around the rotor and will be moved radially inwardly by the stationary finger means.

References Cited in the file of this patent

UNITED STATES PATENTS

| 321,906 | McCormick | July 7, 1885 |
| 499,744 | Lane | June 20, 1893 |
| 976,329 | Witten | Nov. 22, 1910 |
| 1,368,355 | Rutishauser | Feb. 15, 1921 |
| 1,509,389 | Bernard | Sept. 23, 1924 |
| 2,484,276 | Eberhart | Oct. 11, 1949 |

FOREIGN PATENTS

| 232,386 | Germany | Mar. 15, 1911 |
| 496,570 | Great Britain | Nov. 30, 1938 |